United States Patent [19]

Okada et al.

[11] 4,360,884

[45] Nov. 23, 1982

[54] FIGURE DISPLAYING DEVICE

[75] Inventors: Kunihiro Okada; Takeyuki Endo; Shigeru Yabuuchi, all of Hinode; Takakazu Huno, Tachikawa; Kazuyuki Kodama, Kokubunji; Yasutaka Shibuya, Tachikawa, all of Japan

[73] Assignees: Hitachi, Ltd.; Hitachi Denshi Kabushiki Kaisha, both of Tokyo, Japan

[21] Appl. No.: 161,407

[22] Filed: Jun. 20, 1980

[30] Foreign Application Priority Data

Jun. 29, 1979 [JP] Japan .................................. 54-81346

[51] Int. Cl.[3] ........................ G06F 15/20; G06F 3/153

[52] U.S. Cl. .................................... 364/521; 340/739; 364/515

[58] Field of Search ................ 364/515, 521; 340/720, 340/739; 358/96

[56] References Cited

U.S. PATENT DOCUMENTS

| | | | |
|---|---|---|---|
| 3,996,673 | 12/1976 | Vorst et al. | 364/521 X |
| 4,056,713 | 11/1977 | Quinn | 364/521 |
| 4,117,473 | 9/1978 | Habeger, Jr. et al. | 364/521 X |
| 4,146,925 | 3/1979 | Green et al. | 364/521 |
| 4,205,389 | 5/1980 | Heartz | 364/521 X |

*Primary Examiner*—Felix D. Gruber
*Attorney, Agent, or Firm*—Antonelli, Terry & Wands

[57] ABSTRACT

A figure displaying device operates to display a plurality of fundamental figures each defined by a preset number of vectors on a display device of the raster scanning type. The figure displaying device stores the start and end point coordinates of the respective vectors of the respective fundamental figures and the gradient data of the respective vectors of the fundamental figures, and determines whether the respective vectors are located on a horizontal scanning line or not for each fundamental figure prior to the scanning operation of the horizontal scanning line. If the vectors are located on the horizontal scanning line the gradient data corresponding to the vectors on the aforementioned horizontal scanning line is read out and added to the start point coordinates thereby to renew the start point coordinates. A line memory is provided having a capacity corresponding to the number of picture elements in one horizontal scanning line so that preset data can be stored therein at the address corresponding to the added results and a control circuit is provided for consecutively reading the data out of the address in the line memory, which corresponds to the position of the horizontal scanning line being scanned, thereby to effect the display in accordance with the read results.

4 Claims, 21 Drawing Figures

| PERIOD | E0 | E1 | E2 | CB | SELECTION |
|---|---|---|---|---|---|
| BP | 0 | 0 | 0 | 0 | RF1 |
| | 0 | 0 | 0 | 1 | RF1 |
| CP | 0 | 0 | 1 | 0 | RF1 |
| | 0 | 0 | 1 | 1 | RF2 |
| DP | 0 | 1 | 0 | 0 | RF2 |
| | 0 | 1 | 0 | 1 | RF1 |
| EP | 0 | 1 | 1 | 0 | RF2 |
| | 0 | 1 | 1 | 1 | RF2 |
| AP | 1 | 1 | 1 | 0 | FF |
| | 1 | 1 | 1 | 1 | FF |
| FP | 1 | 0 | 0 | 0 | |
| | 1 | 0 | 0 | 1 | |
| GP | 1 | 0 | 1 | 0 | |
| | 1 | 0 | 1 | 1 | |

FIGURE DISPLAYING DEVICE

BACKGROUND OF THE INVENTION

The present invention relates to a figure displaying device which is made capable of displaying a number of figures.

In one of the known figure displaying devices for effecting figure display with the use of a raster scanning type displaying device, the dot date is fed out of a computer and stored in a frame memory for one frame so that the scanning conversion is performed to effect the figure display by that frame memory. As the data to be fed out of the computer is increased, certain disadvantages arise from the fact that the load to be exerted upon the computer is so increased as to decrease the processing speed and that the required capacity of the frame memory is increased.

In order to reduce the load upon the computer, there has been proposed a concept, in which only the start and end points of the vector forming the figure are fed out of the computer so that the corresponding vector or figure may be generated on the basis of the information by the generator provided for each vector and figure and in which the resultant outputs are selected in accordance with the indication of the computer so that they may be stored in the frame memory and displayed. However, the proposed concept is not practical because an increased number of vector generators are required for an increased number of the figures to be displayed.

SUMMARY OF THE INVENTION

An object of the present invention is to provide a figure displaying device which is capable of displaying a number of figures with the use of a remarkably simple construction.

In order to attain such an object, the present invention is characterized in that the figure to be displayed is constructed of the combination of unit figures defined by a preset number of vectors, in that the start and end point coordinates and the gradient data of the respective data of the respective unit figures are stored in a memory, in that whether or not the respective data are located on any horizontal scanning line is examined for each unit figure prior to the scanning operation of that scanning line, in that the gradient data corresponding to the vector located on that horizontal scanning line is added to the vector on the same scanning line so that the content of the memory is renewed in accordance with the added results, and in that the line memory having a capacity corresponding to the number of the picture elements of one horizontal scanning line is written with preset data, while using the added data as an address, so that the content of that line memory is consecutively read out and displayed in accordance with the scanning operation of the afore-mentioned horizontal scanning line.

Figure 1:
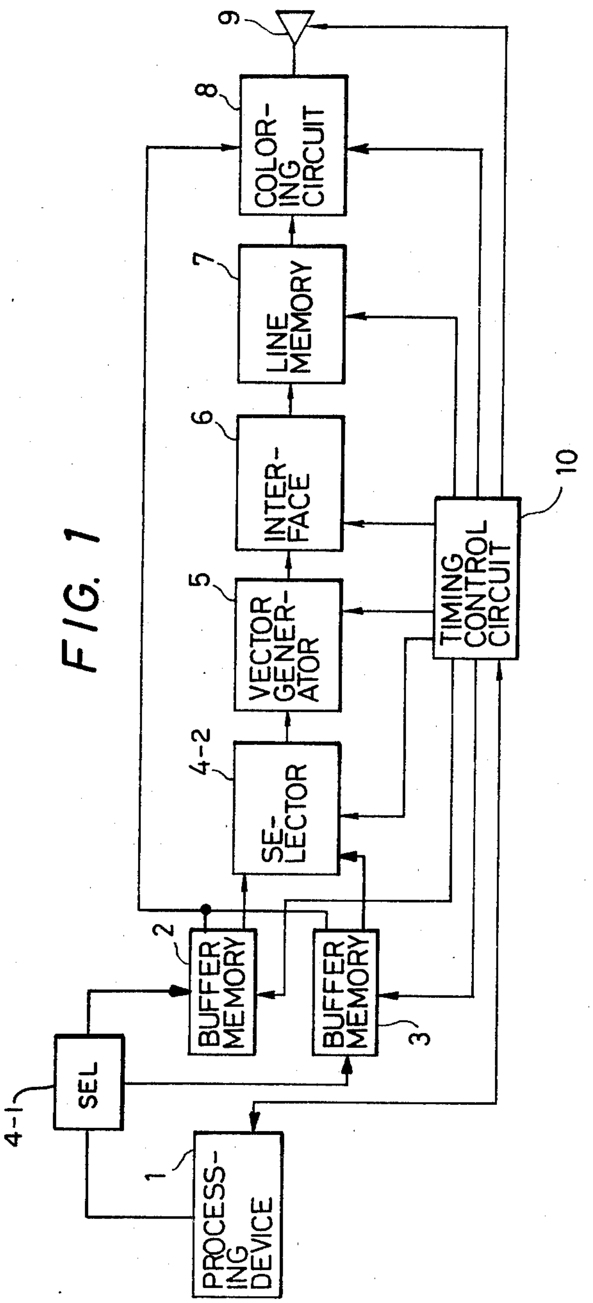
FIG. 1 is a block diagram showing the overall construction of a figure displaying device according to the present invention.
Figure 3:
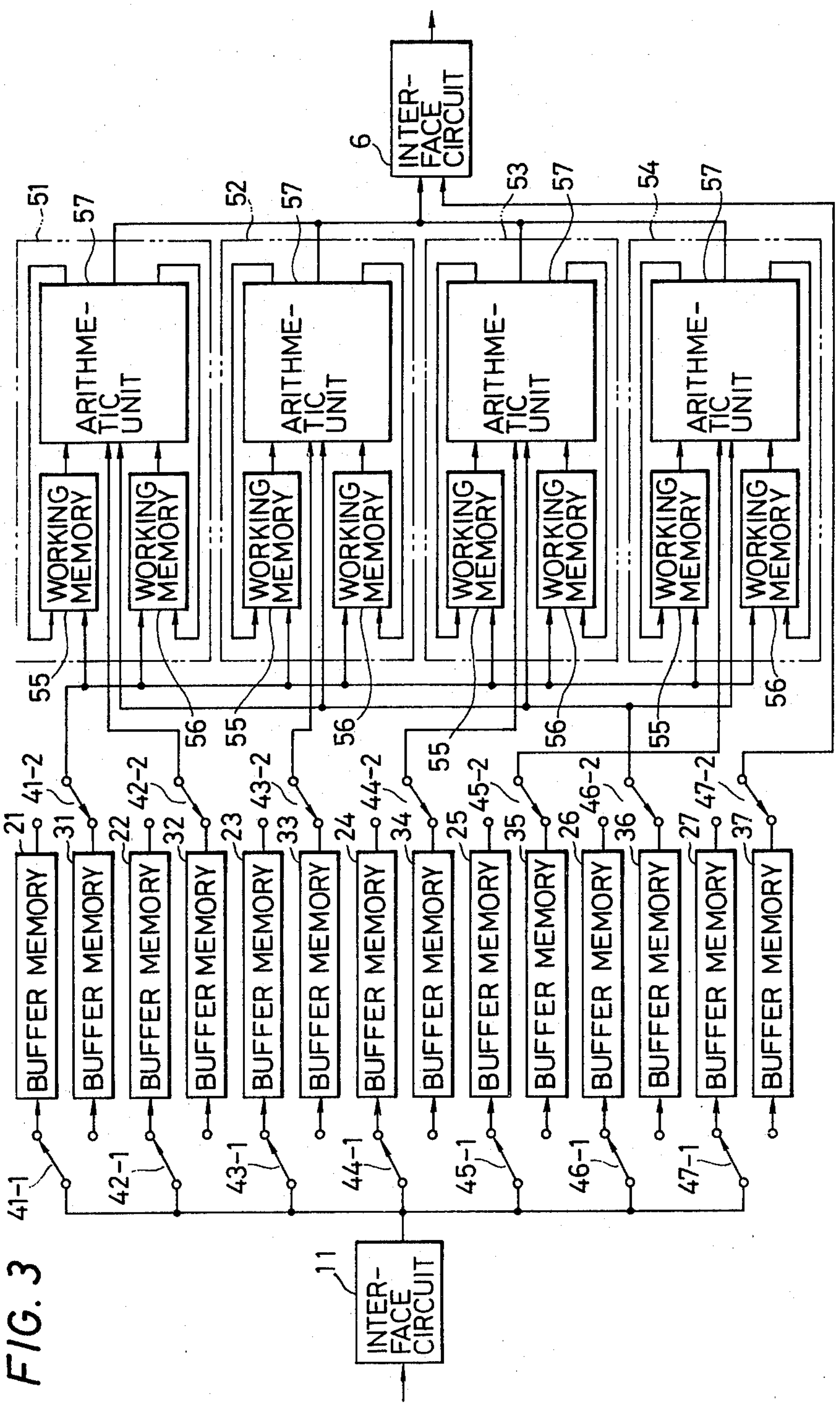
Figure 4:
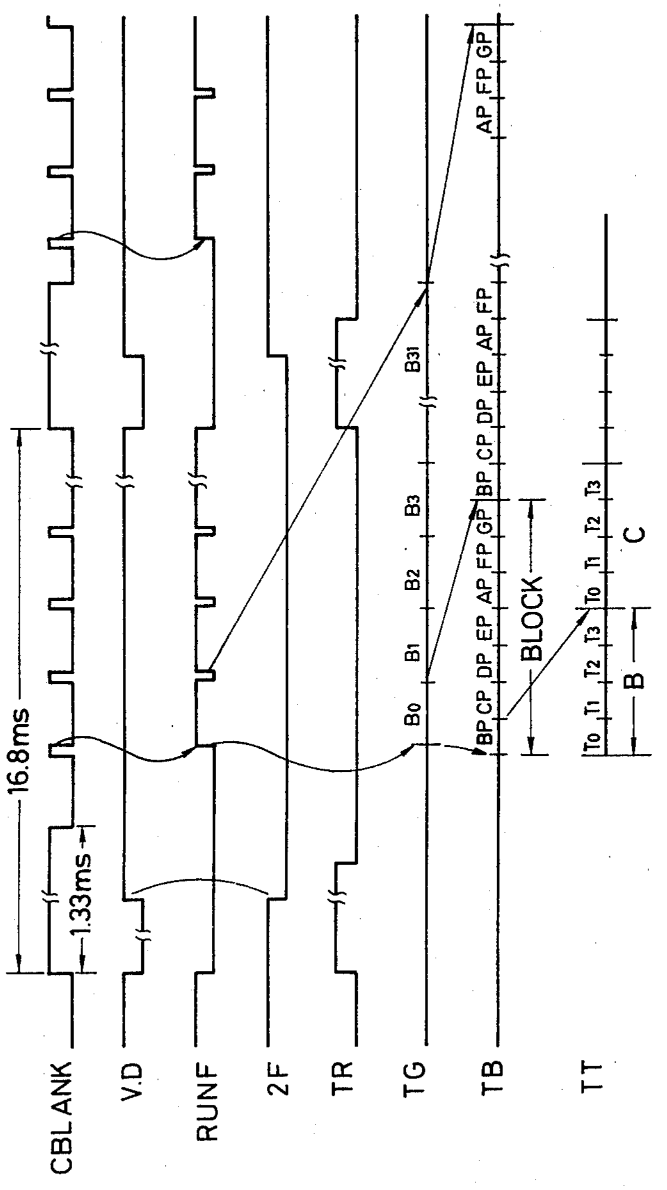
Figure 5:
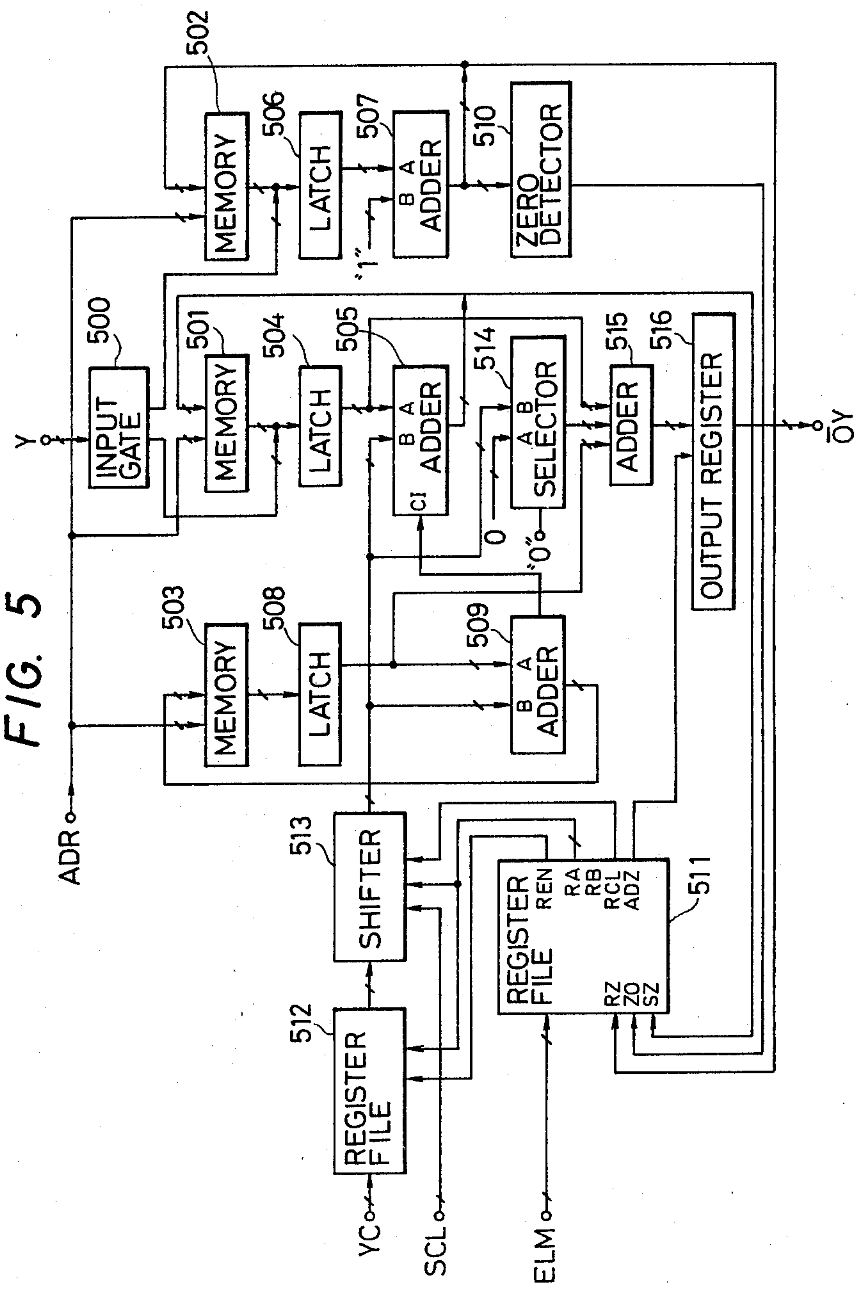
Figure 8:
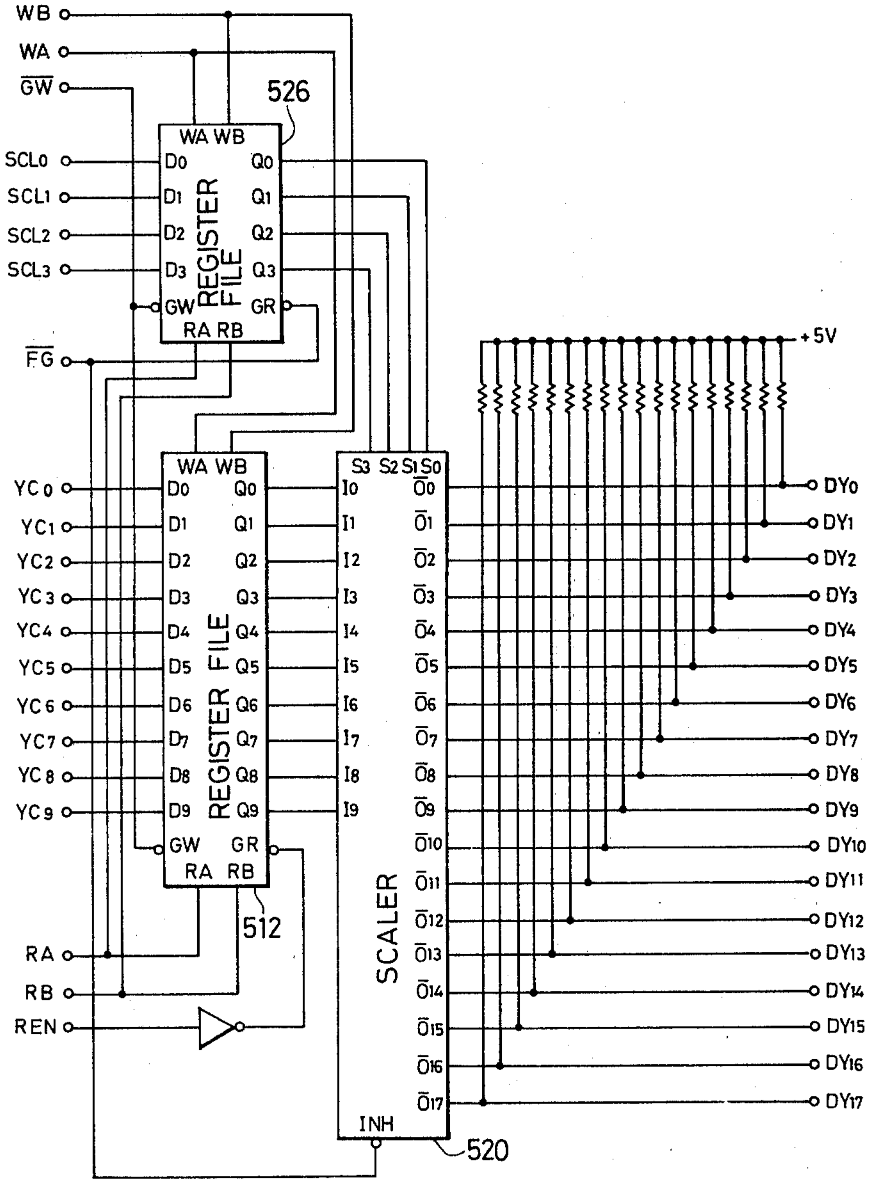
Figure 9:
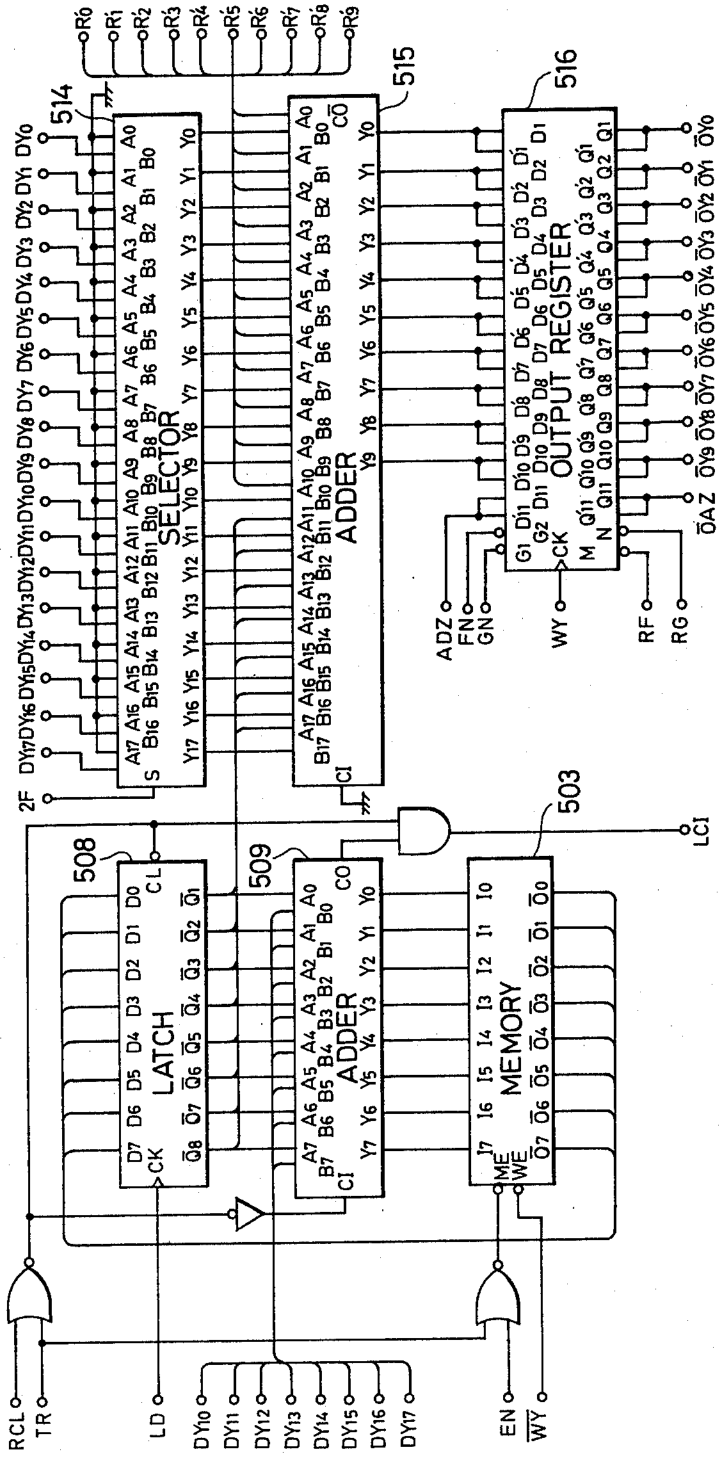
Figure 10:
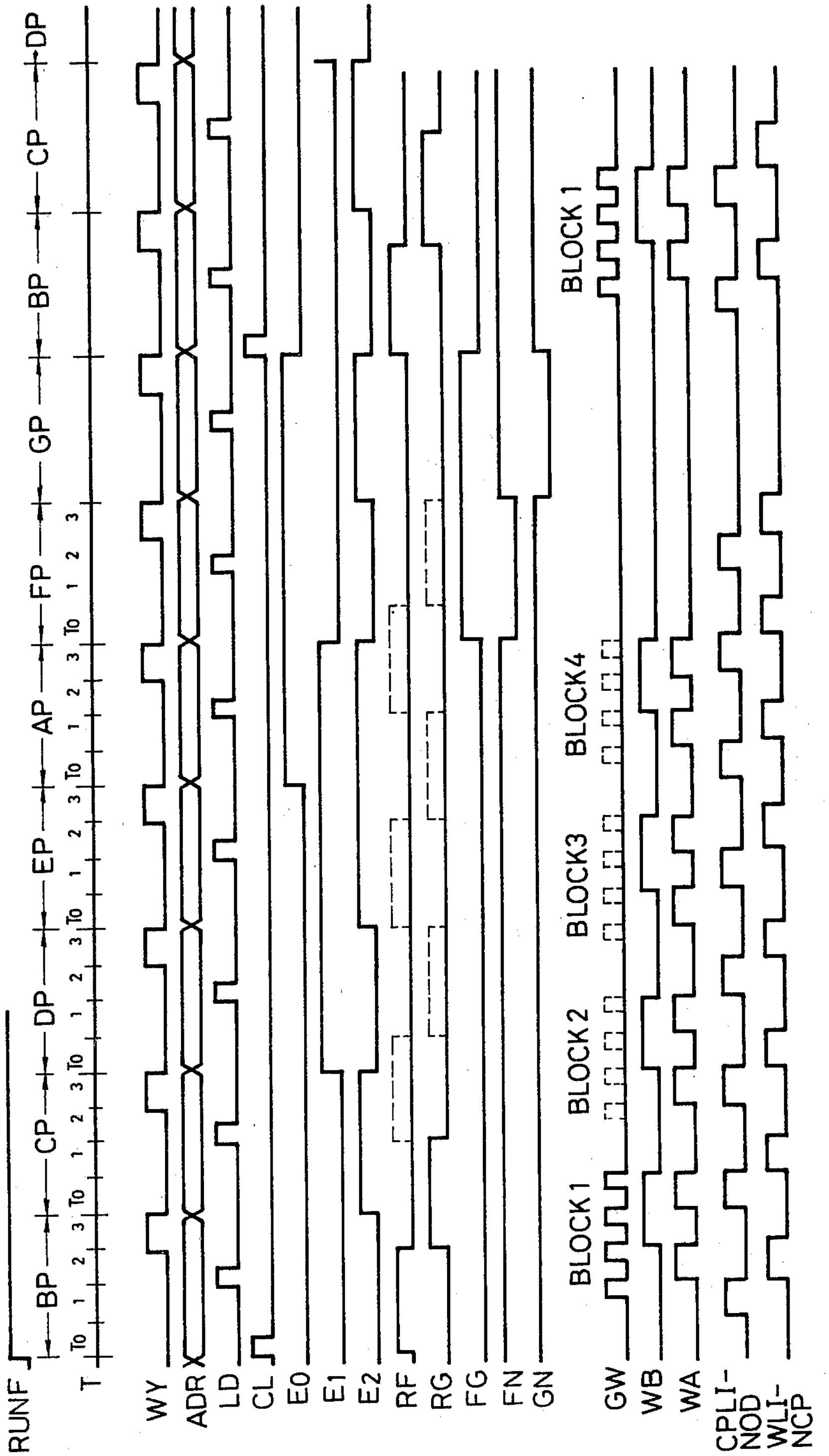
Figures 11, 12:
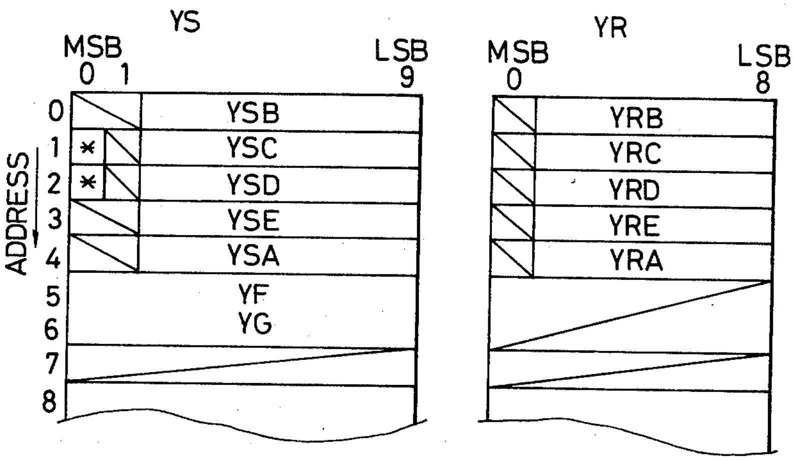
Figure 13:
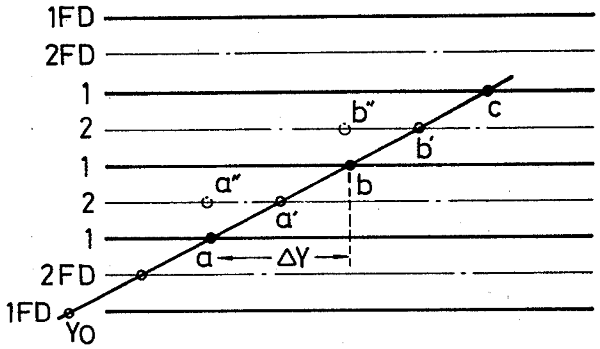
Figure 14:
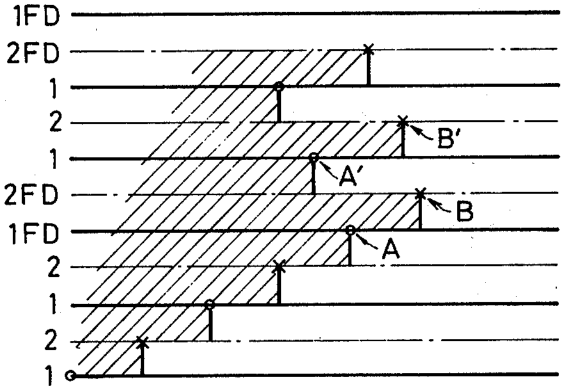
Figure 15:
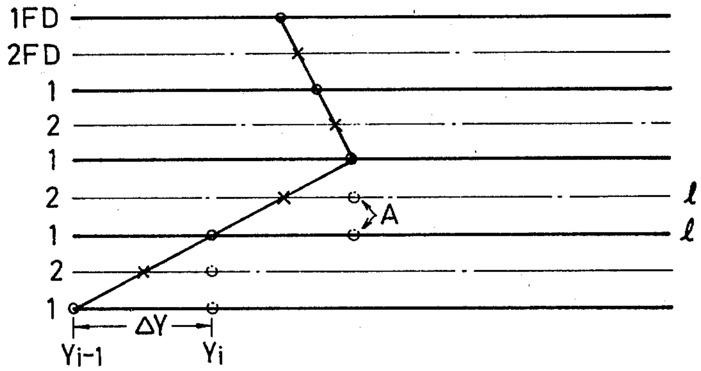
Figure 16:
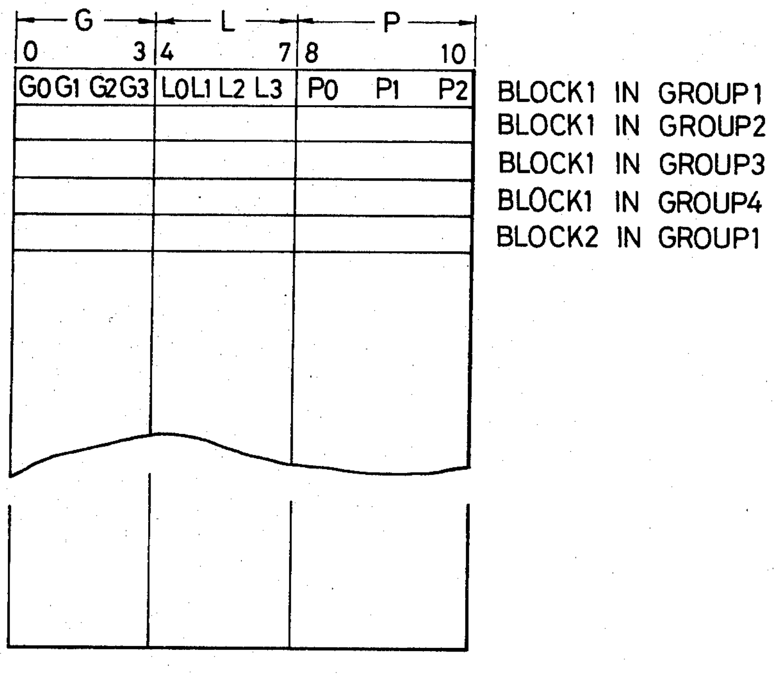
Figure 17:
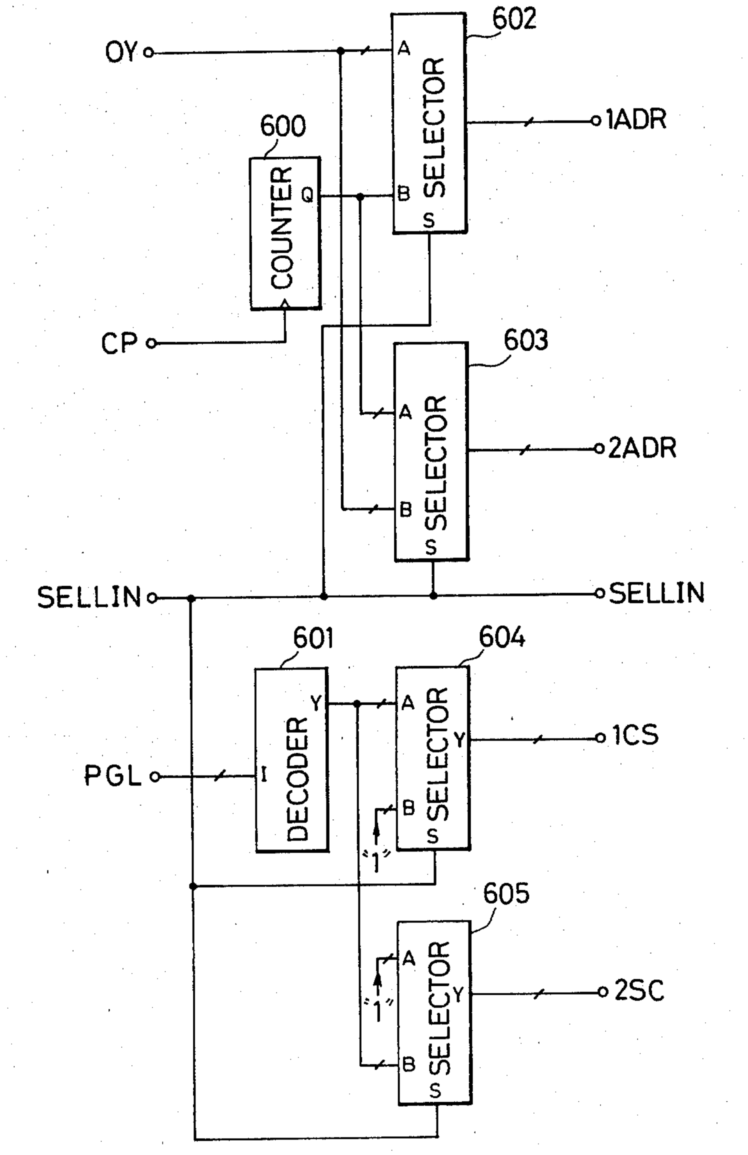
Figure 18:
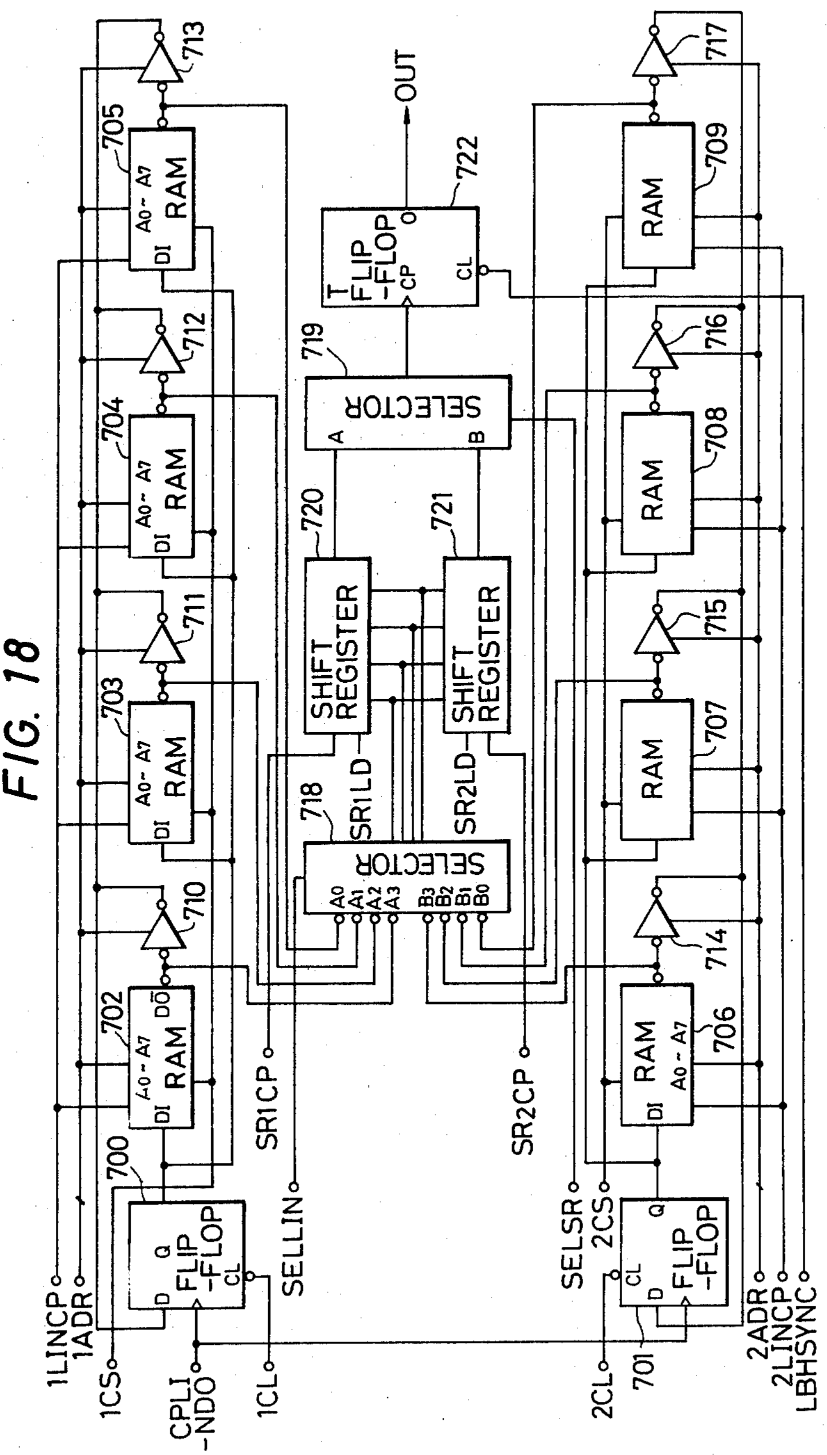
Figure 19:
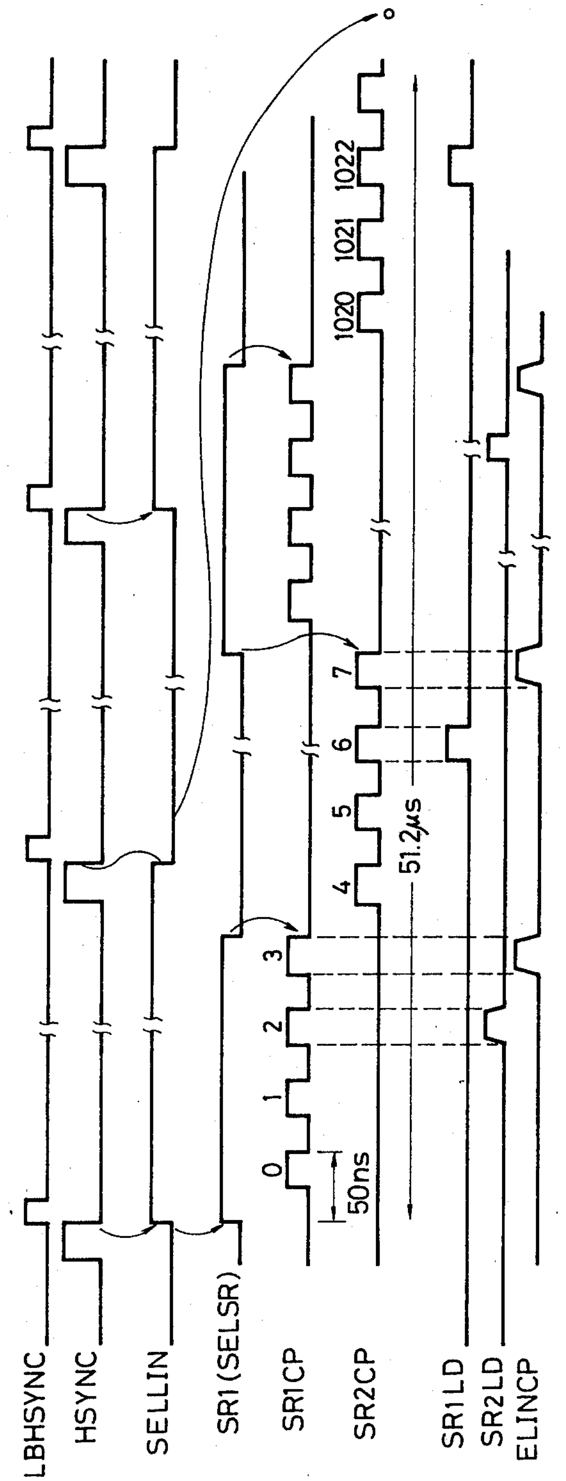
Figure 20:
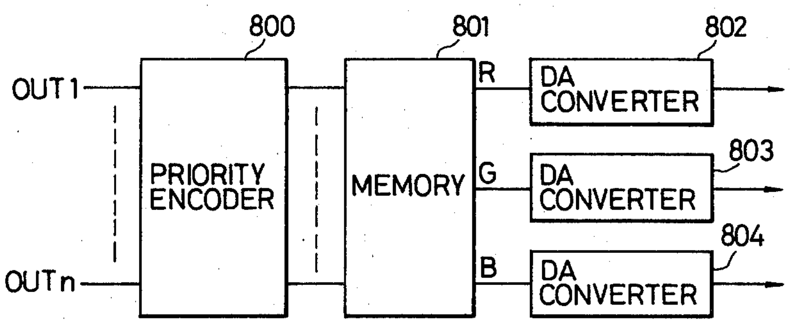
Figure 21:
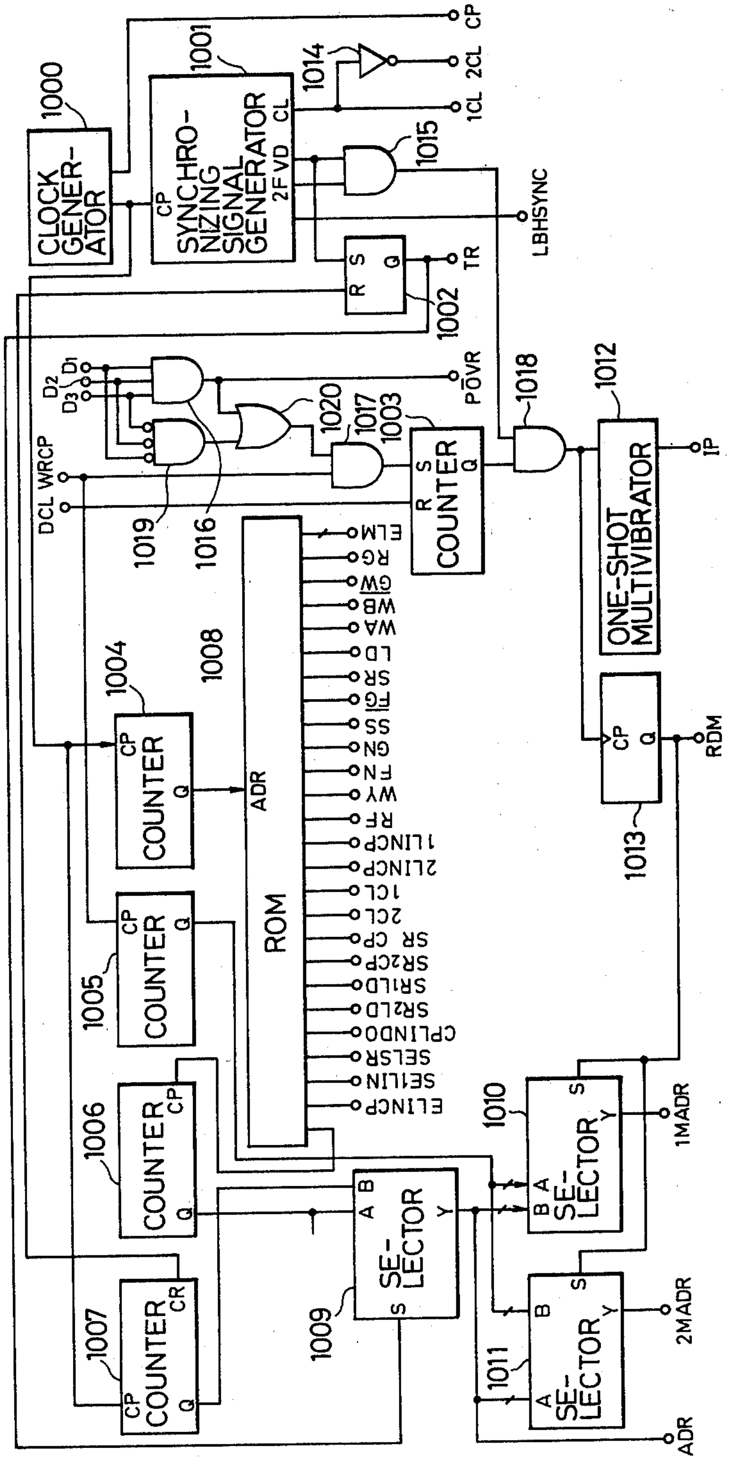

FIGS. *2a–2d* are explanatory views illustrating the fundamentals of the figure display according to the present invention;

FIG. 3 is a block diagram showing one example of the concrete construction of a buffer memory, a selector and a vector generator of FIG. 1;

FIG. 4 is a timing chart explaining the fundamentals of the arithmetic operations of the vector generator;

FIG. 5 is a block diagram showing one example of the concrete construction of a portion of the vector generator of FIG. 3;

FIGS. 6 to 9 are circuit diagrams showing one example of the concrete constructions of the respective portions of FIG. 5;

FIG. 10 is a timing chart explaining the operations of FIGS. 6 to 9;

FIG. 11 is a chart indicating the content stored in the buffer memory;

FIG. 12 is an explanatory view explaining the selecting conditions of a latch and a flip-flop;

FIGS. 13 to 15 are explanatory views showing the problems in the interlaced scanning operation;

FIG. 16 is a chart explaining the construction of output control data;

FIG. 17 is a block diagram showing one example of the concrete construction of a interface of FIG. 1;

FIG. 18 is a block diagram showing one example of the concrete construction of a line memory portion of FIG. 1;

FIG. 19 is a timing chart illustrating the reading operations of FIG. 10;

FIG. 20 is a block diagram showing one example of the concrete construction of a coloring circuit of FIG. 1; and FIG. 21 is a block diagram showing one example of the concrete construction of a timing control circuit of FIG. 1.

DETAILED DESCRIPTION OF THE PREFERRED EMBODIMENTS

The embodiments of the present invention will now be described in detail with reference to the accompanying drawings.

FIG. 1 shows the overall construction of a figure displaying device according to the present invention.

In this Figure, a processing device 1 constructed of a digital computer or the like prepares the initial data for displaying a figure and alternately stores that data in buffer memories 2 and 3. Selectors 4-1, 4-2 select the initial data stored in the buffer memory 2 or 3 and feed it to a vector generator 5. This vector generator 5 accomplishes the processing operations, a will be described in detail in the following, so that the results are fed through an interface 6 to a line memory 7. In accordance with the output from the line memory 7, moreover, a color composite circuit 8 colors the display figure so that the figure is displayed by a monitor 9. Moreover, the controls of those circuits are accomplished by a timing control circuit 10.

Figure 2:
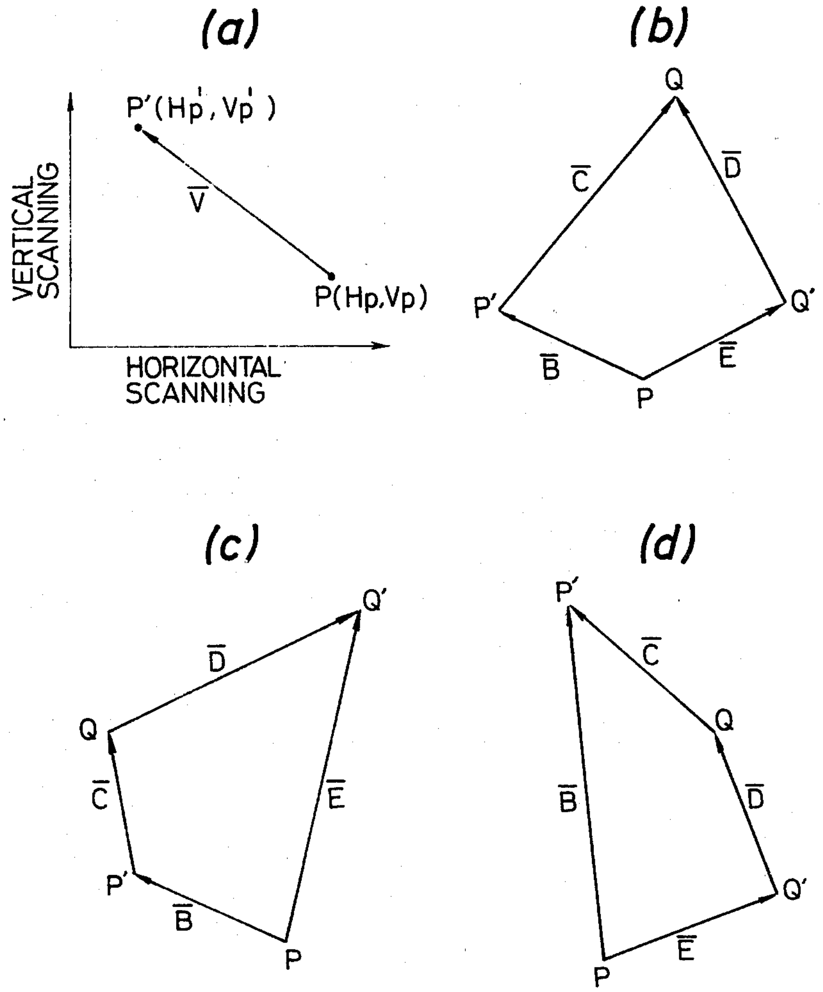

FIG. 2 shows the vectors for the figure display according to the present invention.

A vector $\overline{V}$, as shown in FIG. *2(a)*, is to be displayed by the raster scanning operations. The start and end points of the vector $\overline{V}$ are expressed by coordinates ($H_p$, $V_p$) and ($H_p'$, $V_p'$), respectively. Here, letters $H_p$ and $H_p'$ designate the coordinates in the horizontal scanning direction, whereas letters $V_p$ and $V_p'$ designate the coordinates in the vertical scanning direction. Now, if the vertical scanning direction is taken from the bottom to the top of the Drawing, the vector $\overline{V}$ is obtained by illuminating a beam during a period from the instant when the number of the horizontal scanning lines from below reaches $V_p$ to the instant when the same number reaches $V_p'$ at a position of the corresponding horizontal scanning position. The gradient of the vector $\overline{V}$, i.e., the change H of the beam position on the adjacent horizontal line is expressed by the following Equation (1):

$$H = \frac{H'_p - H_p}{V'_p - V_p} . \quad (1)$$

Thus, the beam position at which the vector is intercepted on each horizontal scanning line is changed for each successive horizontal scanning line in accordance with the gradient of the vector.

By the use of such vectors, it is possible to display such plain figures as are shown in FIGS. 2(*b*) to (*d*). By filling in or coloring the areas of the figures which are contoured by the vectors $\overline{B}$, $\overline{C}$, $\overline{D}$ and $\overline{E}$, specifically, it is possible to display the plain figures. Among FIGS. 2(*b*) to (*d*), in FIG. 2(*b*), the lower end P and the upper end Q of the figure are joined by the two vectors $\overline{B}$ and $\overline{C}$, and $\overline{E}$ and $\overline{D}$, respectively, which are used as a fundamental figure. In FIGS. 2(*c*) and (*d*), the lower end P and the upper end Q' or P' are joined with the three vectors $\overline{B}$, $\overline{C}$ and $\overline{D}$, or $\overline{C}$, $\overline{D}$ and $\overline{E}$ and one vector E or B, respectively, which are used as modified figures.

In this way, the start and end points $H_p$, $V_p$, $H_p'$ and $V_p'$ of the respective vectors indicating the contour of the plain figure are determined together with the gradient ΔH by the use of the processing unit 1 of FIG. 1 and are stored in buffer memories 2 and 3.

FIG. 3 shows one example of the concrete construction of the portion corresponding to the buffer memories 2 and 3, the selector 4 and the vector generator 5 of FIG. 1.

The vector generator 5 of FIG. 1 accomplishes the arithmetic operations relating to the display of the plural plain figures. More specifically, if the arithmetic operation unit for effecting the arithmetic operation of one plain figure is called a block whereas plural blocks are called a group, the arithmetic operations are accomplished consecutively in series for the block unit and in parallel for the group unit. FIG. 3 shows one example of the concrete construction of a portion of FIG. 1, which accomplishes the arithmetic operations of four groups each composed of thirty two blocks.

In FIG. 3, numeral 11 indicates an interface circuit in the processing device 1. Numerals 21 and 31 indicate buffer memories for storing the start point coordinates ($H_p$, $V_p$) and the end coordinates ($H_p'$, $V_p'$) of each vector of each block. Numerals 22 to 25 and 32 to 35 indicate buffer memories for storing the gradient data ΔH of the respective vectors of the respective blocks of the corresponding vectors. Numerals 26 and 36 indicate the buffer memories for storing the addition points for adding the gradient data ΔH of the respective vectors to the start point coordinates $H_p$. Numerals 27 and 37 indicate buffer memories for storing the output control data containing the priorities P of the plain figures of the respective blocks and the selection data G and L for the monitor indication and the color indication. Numerals 41 to 47 indicate selectors for selecting one of the paired buffer memories. Numerals 51 to 54 indicate vector generators provided for the respective groups. Numerals 55 and 56 indicate working memories for first storing the coordinates of the start and end points from the buffer memory 21 or 31 and then the interim progress of the various arithmetic operations. Numeral 57 indicates an arithmetic unit for accomplishing the preset arithmetic operation in accordance with the contents of the working memories 55 and 56. Incidentally, the working memories 55 and 56 and the arithmetic unit 57 are provided for the respective vector generators 51 and 54 corresponding to the respective groups. On the other hand, there is shown no control signal from the timing control circuit 10 of FIG. 1 in FIG. 3.

The two buffer memories (e.g., those indicated at 21 and 31) are so paired that, when one buffer memory (e.g., 21) receives the data from the processing device 1 through the interface circuit 11 and the selector (e.g., 41-1), the other buffer memory (e.g., 31) has its content fed to the vector generator 5 through the selector (e.g., 41-2). These relationships are switched for each frame. However, these switching operations are not performed either in the case when the transmission from the processing device 1 is not ended during one frame period or in the case where the display of a still figure is made.

Thus, in the case when the processing device 1 ends the data processing operations of the whole figures to be displayed so that the data is transferred to the buffer memory 2 or 3 and in the case where the data in the area of the buffer memory for the vector generation disappears, transmission over signals TA and TB is established from the processing device 1 in the buffer memory 27 or 37 and is fed to the timing control circuit 10 of FIG. 1. In response to the transmission over signal TA, the timing control circuit 10 generates interrupt signals IP for the processing device 1, when the subsequent vertical synchronizing pulse is generated, and the signals RDM for switching the writing and reading operations of the buffer memory. In response to the transmission over signal TB, on the other hand, the timing control circuit 10 generates signals ROUR for prohibiting the writing operation of the buffer memory and generates both an interrupt signal for the processing device 1 and the signal RDM for effecting the switching of the buffer memories in synchronism with the subsequent vertical synchronizing signal.

Among the buffer memories in the reading mode, on the other hand, the start and end data of the respective vectors, which are stored in the buffer memory 21 or 31, are transferred during the vertical blanking period to the memories 55 and 56 of the vector generators 51 to 54 corresponding to the respective groups. The arithmetic unit 57 of each vector generator accomplishes the arithmetic operation for each block by the use of the contents of the memories 55 and 56 so that the vector coordinate data is generated and fed out to the line memory 7 (as shown in FIG. 1) for forming the plain figure.

FIG. 4 is a timing chart for explaining the arithmetic operation of the vector generator 5 according to the present invention and shows the timing corresponding to the composite synchronizing signal to the monitor. Incidentally, this monitor is set to operate in accordance with the standard interlaced scanning operation.

The buffer memories 2 and 3 of FIG. 3 are switched in response to the signals, which are prepared by inverting the vertical synchronizing signal of the composite synchronizing signal CBLANK of the monitor shown in FIG. 4, i.e., the rise timing of vertical driving pulses VD. While signals TR indicating the vertical blanking period are being generated, the content of the buffer memory 2 or 3 is stored in the memories 55 and 56 in the vector generator corresponding to the groups. Then, the arithmetic operation starting control signal RUNF which is synchronized with the second horizontal scanning signal of the first field is generated so that the arithmetic operations are simultaneously started by the vector generators 51 to 54 corresponding to the four groups.

As has been stated before, the arithmetic unit necessary for the display of one plain figure is called one block whereas the group composed of plural blocks is called one group. Now, if each group is composed of thirty two blocks, as has been described before, the arithmetic operations of the thirty two blocks B0 to B31 are accomplished consecutively in seres for one horizontal scanning period, as shown at timing TG. In other words, during the one horizontal scanning period for each group, the arithmetic operations for displaying the thirty two plain figures are effected. If there are the four groups as the components, as has been described before, the arithmetic operations are performed for the display of plain figures in a number equal to $4\times32=128$. When the arithmetic operations of the 32 blocks are ended during one horizontal scanning period, the signal RUNF is stopped, and the arithmetic operation is started from the first block once again during the subsequent horizontal scanning period.

The arithmetic operation period of one block is divided, as at the timing TB, into seven arithmetic portions BP, CP, DP, EP, AP, FP and GP. Each of these arithmetic portions is divided into four timing periods T0 to T3, as shown at timing TT.

Incidentally, numeral 2F in FIG. 4 indicates the field signal of the second field of the interlocked scaning and is used for the special arithmetic operation, as will be described later. The timing indicated in FIG. 4 is controlled by the timing control circuit.

The arithmetic contents of the arithmetic operation periods BP, CP, EP, AP, FP amd GP, which have been described before, will now be explained in detail.

The embodiment of the present invention is characterized in that the quadrilaterials shown in FIGS. 2(*b*) to (*d*) are used as the figure display unit. Specifically, the four vectors defining a quadrilaterial are generated so that the portion defined thereby is displayed as a plain figure. Since, in this case, a monitor of the raster scanning type is used, the horizontal vector having no gradient need not be considered so that a square having no gradient can be displayed with only two vectors.

By using the quadrilaterial as the fundamental figure, a triangle can be displayed as the condition under which one of the four vectors is eliminated. A figure of a polygon or a pentagon or more can be displayed as a combination of a quadrilateral and/or a triangle.

In the aforementioned arithmetic operation periods BP, CP, DP and EP, the arithmetic operations are performed to determine whether or not the present scanning point is contained during the time period from the start points to the end points of the vectors $\overline{B}$, $\overline{C}$, $\overline{D}$ and $\overline{E}$, as shown in FIG. 2. In the arithmetic operation period AP, the arithmetic operation is performed to determine whether or not the scanning point reaches the end point of the display range of the plain figure. In the arithmetic operation periods FP and GP, the arithmetic operation is performed to determine the vector position on the horizontal scanning line being scanned. In the case of FIG. 2(*b*), the positions of the vectors $\overline{B}$ and $\overline{C}$, and $\overline{E}$ and $\overline{D}$ on the respective horizontal scanning lines are determined at the arithmetic operation periods FP and GP, respectively. In the case of FIG. 2(*c*), the positions of the vectors $\overline{B}$, $\overline{C}$, $\overline{D}$ and the position of the vector $\overline{E}$ are determined at the arithmetic operation periods FP and GP, respectively. In the case of FIG. 2(*d*), the position of the vector $\overline{B}$ and the positions of the vectors $\overline{C}$, $\overline{D}$, $\overline{E}$ are determined at the arithmetic operation periods FP and GP, respectively. In case the arithmetic operations for the figures shown in FIGS. 2(*c*) and 2(*d*) are to be performed, the arithmetic indicating data, as will be described later, is used to determine which position is to be subjected to the arithmetic operation at the operation periods FP and GP, respectively.

FIG. 5 shows one example of the concrete construction of the portion of the group of the vector generators 51 to 54 of FIG. 3.

The start and end point coordinates of the respective vectors, which are stored in the buffer memory 21 or 31 of FIG. 3, are fed during the vertical blanking period through an input gate 500 to the memories 501 and 502, respectively, so that they may be stored therein. Simultaneously with this, a zero is stored in the memory 503 indicating the lower bit of the content of the memory 501. More specifically, the start point data of the vector in the buffer memory is initially stored in a latch 504 through the input gate 500, and the output of the latch 504 is added to the contents of memory 501 through an adder 505. Since, at this time, one terminal B of the adder 505 and a carry input terminal CI are supplied with the signal having all bits at "1", the data of the buffer memory 21 is stored without modification in the memory 501. On the other hand, the end point data of the vector in the buffer memory 22 is initially stored through the input gate 500 in a latch 506, the output of which is added through an adder 507 to the memory 502. Since, at this time, one terminal B of the adder 507 and the carry input terminal (which is not shown) are supplied with the signal having all bits at "1", the data of the buffer memory is stored without modification in the memory 502. During those operating periods, moreover, since a latch 508 is cleared so that one terminal B of an adder 509 and the carry input terminal (which is not shown) are supplied with the signal having all bits at "1", the content of the memory 503 is reduced to zero. The junction between the output of the input gate 500 and the outputs of the memories 501 and 502 are constructed to provide a tri-state output and are so controlled that one output is neglected when the other is used.

During the arithmetic operation periods BP, CP, DP and EP, the arithmetic operations, which will be described later, are accomplished by the latches 504, 506 and 508 and the adders 505, 507 and 509 so that results SZ and RZ are generated. On the other hand, a zero detector 510 generates a signal ZO indicating whether the output of the adder 507 is zero or not. The outputs thus generated are stored in and read out of a register file 511 in accordance with the signal ELM indicating the order of the arithmetic operations. On the other hand, a register file 512 receives and stores a signal YC indicating the gradient ΔH of the vector necessary for the display of one plain figure from the buffer memories 22 to 25 or 32 to 35 of FIG. 3. During the arithmetic operation periods FP and GP, a shifter 513 shifts the gradient signal YC in the register file 512 on the basis of the arithmetic operation results, which are read out of the register file 511, and the scale signal SCL indicating the addition point of the gradient so that the results are fed to the adders 505 and 509 and the terminal B of a selector 514. In this instance, the terminal B of the selector 514 is supplied with the gradient signal under the condition, in which it is shifted down one bit, thereby to generate a signal corresponding to $\frac{1}{2}$ ΔH. The adders 505 and 509 add the gradient signal thus generated to the coordinate values stored in the memories 501 and 503 so that the results are stored again in the memories 501 and 503. In response to the signal 2F, which identifies the first field and the the second field, the selector 514 generates a signal having all bits at "0" during the scanning operation of the first field and the signal of the shifter 513 during the scanning operation of the second field. An adder 515 adds the outputs of the memories 501 and 503, indicating the upper and lower bits of the vector position on the horizontal scanning line, to the output of the selector 514 so that the results are set in an output register 516. On the other hand, the signal ADZ corresponding to the arithmetic operation result stored in the register file 511 is also set in the register 516 so that an output signal OY is generated from the register 516 at the proper time.

Incidentally, the writing and reading addresses of the memories 501, 502 and 503 are determined by a signal ADR.

The more specific operations during the respective arithmetic operation periods will be explained in more detail in connection with the embodiment, as in the following.

Figure 6:
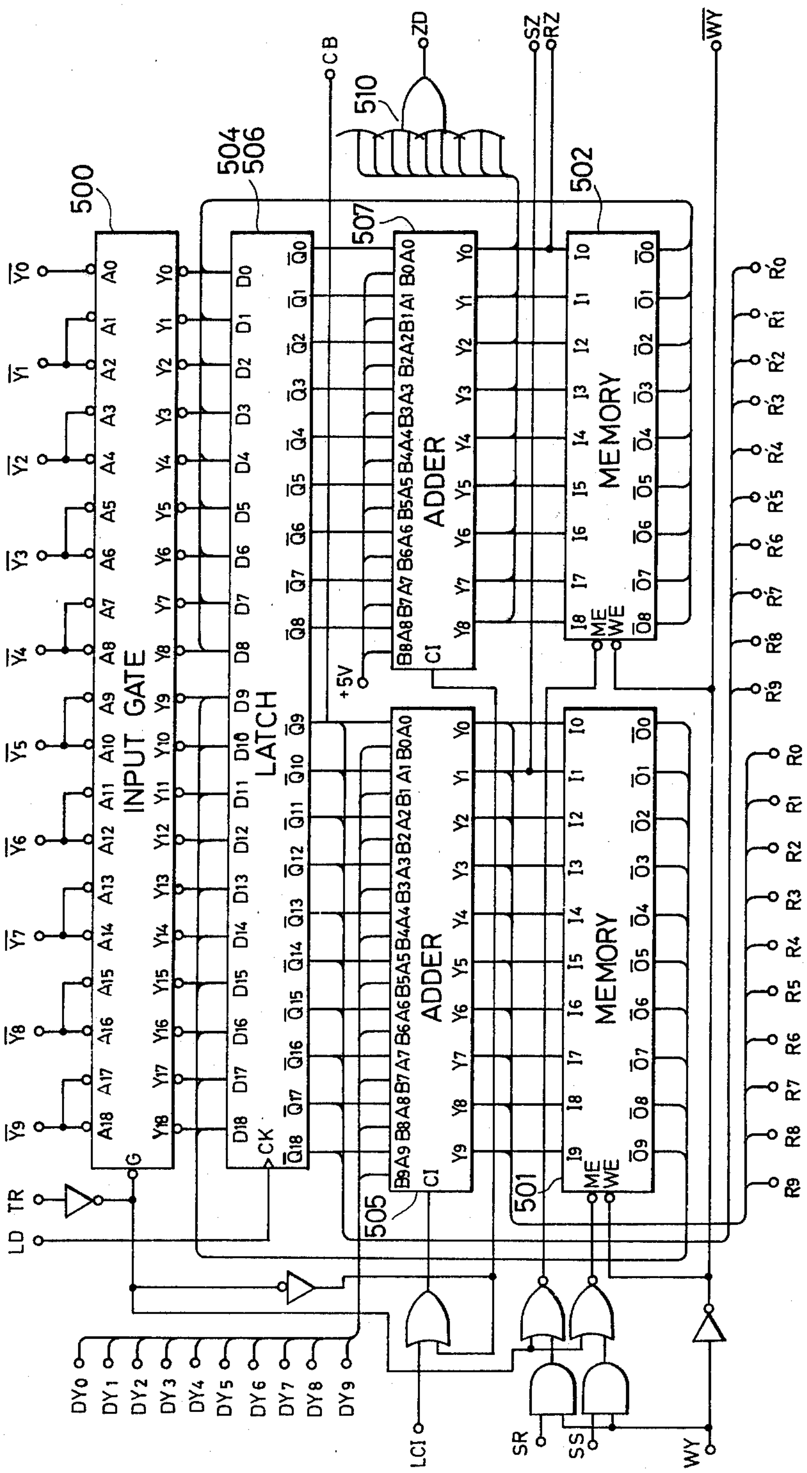
Figure 7:
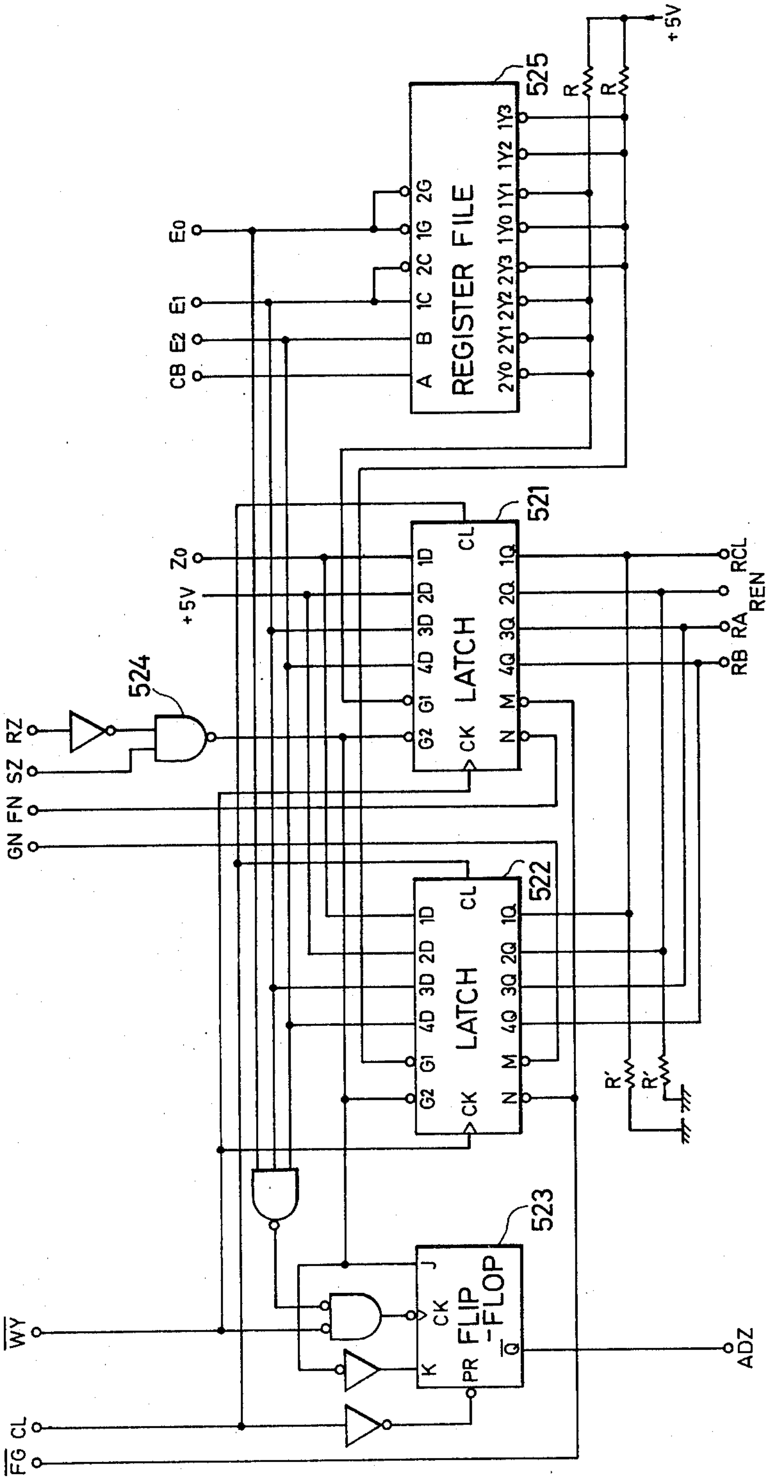

In FIGS. 6 to 9 showing the concrete constructions of the respective portions of FIG. 5: FIG. 6 shows the portion corresponding to the input gate 500, the memories 501 and 502, the latches 504 and 506, the adders 505 and 507 and the zero detector 510 of FIG. 5; FIG. 7 shows the portion corresponding to the register file 511 of FIG. 5; FIG. 8 shows a portion corresponding to the register file 512 and the shifter 513 of FIG. 5; and FIG. 9 shows a portion corresponding to the memory 503, the latch 508, the adder 509, the selector 514, the adder 515 and the output register 516 of FIG. 5.

FIG. 10 is a timing chart for illustrating the operations of the circuits of FIGS. 6 to 9. The arithmetic operation methods during the respective arithmetic operation periods BP, CP, DP, EP, AP, FP and GP will be described in detail with reference to that timing chart.

The data necessary for the arithmetic operations are set in advance in the preset buffer memory 2 or 3 by the processing device 1, and the timing signals necessary for the arithmetic operations are prepared by the timing control circuit 10. On the other hand, the data set in the buffer memory 2 or 3 is expressed in a binary notation having the display frame of the monitor standardized at −1 at the lower end and at the lefthand end and at +1 at the upper end and at the righthand end.

The content of the buffer memory 21 or 31 of FIG. 3 is composed of the memory portion YS for storing the start point coordinates of the respective vectors and the memory portion YR for storing the end point coordinates of the same. As shown in FIG. 11, more specifically, the data in the memory portion YS is stored for each arithmetic operation of one plain figure, i.e., for each block with the data YSB to YSE (which will be called the set data) corresponding to the horizontal scanning line of the start point of the respective vectors $\overline{B}$ to $\overline{E}$, the data YSA corresponding to the horizontal scaning line of the start end of the figure, and the data YF and YG (which will be called the start value) for locating the start point of the figure on the horizontal scanning line. On the other hand, the memory portion YR is stored for each block with the data (which will be called the reset data) corresponding to the horizontal scanning line of the respective end points of the vectors $\overline{B}$ to $\overline{E}$ and the data YRA corresponding to the horizontal scanning line of the end point of the figure. Incidentally, in case there is only one start value, as shown in FIGS. 2(*b*) to (*d*), the same data are written in the data YF and YG.

In the usual scanning type monitor, since the number of the horizontal scanning lines of one field is at most 256, the data YSB to YSA can be constructed of nine bits including the detection bits, as will be described later. If the position on the horizontal scanning line is discriminated in a unit of 1/1000, the data YF and YG have to be composed of ten bits. In the present embodiment, therefore, the data of the memory portion YS is set to have ten bits, and the data of the memory portion YR is set to have nine bits. Moreover, the most significant bit of the data YSC and YSD of the memory portion YS, that is indicated by an asterisk, is the aforementioned deformed arithmetic indication data so that it becomes a bit indicating "0" for the figure of FIG. 2(*b*) and a bit indicating "1" for the figures of FIGS. 2(*c*) and (*d*). Moreover, the second bit of the data YSB to YSA and the highest bit of the data YRB to YRA are set at "0" and are used in the detecting bit of the set data, as will be described later.

The data YSB to YSA and YRB to YRA thus constructed are expressed at a value ranging from −1 to +1, as has been described before. In order to shift up that value by +1 to a range from 0 to +2, the symbols of the third bit of the data YSB to YSA and the second bit of the data YRB to YRA are inverted when the content of the buffer memory 2 or 3 is transferred to the working memory of the vector generator 5. By accomplishing the data conversion in the ways thus far described, the arithmetic operations are simplified in the manner to be described in the following.

If, for example, the set data is at −0.5, this corresponds to the case, in which the vector generation is effected at the horizontal line at the quarter point from the lower end on the monitor display surface. If the number of the horizontal scanning lines is set at 256, the set data is expressed by 0011000000 in the binary system. Since the third bit becomes 0001000000 if that third bit is inverted, a negative value (having "1" at the second bit) is obtained by the sixty four horizontal scanning operations if the value 0000000001 is subtracted therefrom for each horizontal scanning operation. By detecting this, the timing of the vector generation can be determined. Incidentally, it will be recalled that the vertical scanning operations are performed from the bottom toward the top of the picture frame.

Likewise, in case the set data is at +0.5, the third bit is inverted to 0011000000, and the second bit is changed to "1" by the 192 scanning operations.

In order that the content of the buffer memory 2 or 3 may be stored in the memories 501 and 502 of the vector generator 5, the vertical blanking period signal TR shown in FIG. 4 is used. Specifically, when the signal TR is changed to "1", as shown in FIG. 6, the data Y0 to Y9 from the buffer memory is fed through the input gate 500 to the latches 504 and 506 where it is temporarily stored by a load signal LD. When the signal TR is at "0", on the other hand, the outputs DY0 by DY17 at "1" are generated from the shift portion 520 in response to the signal $\overline{FG}$, which is fed to the terminal INH of the shift portion 520 of FIG. 8, so that the outputs DY0 to DY9 are fed to the adder 505. Since, moreover, the input to the carrier input terminal CI thereof is also at "1", the outputs of the latches 504 and 506 are transmitted without modification to the memories 501 and 502. When the data from the buffer memory is that of the memory portion YS, the memory 501 is selected in response to a signal SS. When the data is that of the memory portion YR, the memory 502 is selected in response to a signal SR so that the data is stored in the selected memory in response to a write signal WY. Although not shown in FIG. 6, incidentally, the address signal ADR is impressed upon the respective memories 501 and 502 so that the data is written in and read out of the indicated addresses, respectively.

As shown in FIG. 9, on the other hand, when the signal TR is changed to "1", the latch 508 is cleared and the carry input at the terminal CI of the adder 509 is at "1" and all the outputs DY10 to DY17 are at "1". As a result, the memory 503 is stored with zero in response to the write signal WY. Even in this figure, the address signal ADR is impressed upon the memory 503 so that the data writing and reading operations are accomplished in a similar manner.

When the period for the second horizontal scanning line is reached, the arithmetic operation period signal, as shown in FIGS. 4 and 10, is generated so that the arithmetic operations of the respective arithmetic operation periods BP to GP at the respective blocks are accomplished.

First of all, at the timing T0 of the arithmetic operation period BP, the latches 521 and 522 and the flip-flop 523, as shown in FIG. 7, are cleared in response to the clear signal CL shown in FIG. 10. At the timing T2 after the addresses of the memories 501 to 503 are fixed, the data YSB and YRB of the memories 501 and 502 is read out in the latches 504 and 506 of FIG. 6 and stored temporarily in response to the load signal LD shown in FIG. 10. The outputs of those latches are impressed upon the one side input terminals of the adders 505 and 507. At this time, since all the signals at the other input terminals of the adders 505 and 507 are at "1" whereas the signal at the carry input terminal CI is at "0", the value corresponding to the one horizontal scanning line, i.e., 1/256 is subtracted from the data YSB and YRB in the adders 505 and 507. And, the results are stored in the memories 501 and 502 in response to the write signals WY at the timing T3. At the same time, by extracting the signals of the second and most significant bits (or the detection bit) of the outputs of the adders 505 and 507, the signal indicative of the fact that the start point of the vector is reached and the signal indicative of the fact that the end point of the vector is reached are generated, the AND of the inverted value of the signal RZ and the signal SZ is determined by an NAND circuit 524, as shown in FIG. 7, so that the results are impressed upon the terminals $G_2$ of the latches 521 and 522 and upon the terminals J and K of the flip-flop 523. Since the vector $\overline{B}$ is being generated while the output of the NAND circuit 524 is at "0", i.e., that the present scanning line falls between the beginning and end of the vector, it is indicated that the data necessary for generating the vector can be taken thereinto.

On the other hand, the output ZD of the zero detecting NOR circuit 510, as indicating that all the outputs of the memory 502 are at "0", is fed to the terminal 1D of the latches 521 and 522, and the fixed signal +5 V indicating that the data is stored is fed to the input terminal 2D of the latches 521 and 522. Moreover, the signals E1 and E2 are fed to the terminals 3D and 4D of the latches 521 and 522. The combination of those signals E1 and E2 indicates which vector is being subjected to the arithmetic operation.

On the other hand, the decoder 525 of FIG. 7 is supplied with all of the signals E0 to E2 corresponding to the signals ELM (FIG. 5) indicating the arithmetic operation order and the deformed arithmetic operation indicating data CB corresponding to the highest bit of the memory 501 so that one of the latches 521 and 522 is selected by the combination of those signals. Specifically, the signals E0 to E2 have different values for the respective arithmetic operation periods, as shown in FIG. 10, so that the signal for selecting one of the latches 521 (or RF1) and 522 (or RF2) is generated, as tabulated in FIG. 12, by the combination of those different values and the data CB indicative of whether or not the figure to be displayed is the deformed one. On the other hand, when all the signals E0 to E2 are at "1", the flip-flop 523 (FF) is started in respose to the signals WY at the timing T3 so that the output of the NAND circuit 524 is introduced during the arithmetic operation period AP. In the aforementioned arithmetic operation period BP, the latch 521 (RF1) is selected irrespective of the value of the deformed arithmetic operation indicating data CB so that the arithmetic operation results during the arithmetic operation period BP are stored in the latch 521. During the arithmetic operation periods CP, DP and EP, the arithmetic operations are accomplished similarly to those during the arithmetic operation period BP so that the results are stored in the latch 521 or 522 which is indicated by the decoder 525.

By the arithmetic operations thus far described, there can be generated: the signal indicating the period from the start point to the end point of the vector, i.e., the signal REN indicating whether or not the present horizontal scanning line is located between the start and end points of the vector; the signal indicating which vector is to be generated, i.e., the signals RA and RB indicating the number of the vector to be intersected by the present scanning line; the signal indicating the display range, i.e., the signal ADZ indicating whether or not the present scanning line is located within the range of the corresponding figure range; and the signal indicating the final point of the vector to be expressed by the signals RA and RB, i.e., the signal RCL indicating that the present scanning line reaches the final point of the vector.

The processing operations for generating the vector during the arithmetic operation periods FP and GP will be described in the following.

In order to effect the vector generator, both the data YF and YG indicating the position of the start point of the vector on the horizontal scanning line, i.e., the initial value and the data indicating the gradient of the vector are indispensable. Among this data, the initial value data YF and YG is transferred during the vertical blanking period from the buffer memory to the memory 501, as has been described before. On the other hand, the gradient indicating data is composed of the mantissa portion YC and the scale signal SCL indicating the weight of the portion YC upon the initial value of the vector and is stored in the register files 526 and 512 of FIG. 8 from the buffer memory until the arithmetic operation periods FP and GP are reached.

Specifically, the four timing signals GW are generated for each group so that the signals YC and SCL are written in the respective 0th to third addresses of the register files 526 and 512 in response to those timing signals GW and the address signals WA and WB at each timing. More specifically, the data for generating the vector on the basis of the arithmetic operation results during the arithmetic operation periods BP to EP is written in the 0th to third addresses. Thus, by the time the arithmetic operation period AP is ended, the gradient signals of the corresponding blocks for each group are transferred to the register files 526 and 512.

The signals YC and SCL thus written are read out in the following manner. Specifically, during the arithmetic operation period FP, the content of the latch 521 (FIG. 7) is read out in response to the signals FN and $\overline{FG}$ shown in FIG. 10 to generate the signals RA, RB and REN, which are then fed to the register files 526 and 512 so that the data which has been written in advance is read out in response to the signal FG. During the arithmetic operation period GP, on the other hand, the outputs RA, RB and REN of the latch 522 are read out in response to the signals GN and $\overline{FG}$ shown in FIG. 10, and the signals are fed to the register files 526 and 512 so that the data which has been written in advance is read out with the use of the signal FG.

During the arithmetic operation periods FP and GP, on the basis of the control signals FG, the scaler 520 shifts down the value of the signal YC, which is read out of the register file 512, with the use of the scale signal SCL which is read out of the register file 526. The resultant outputs DY0 to DY17 are impressed upon the adders 505 and 509 and added to the signals, which are read out of the memories 501 and 503 to indicate the positions on the horizontal scanning line, so that the added results are stored again in the memories 501 and 503. During the arithmetic operation periods, in short, the gradient signal is added to the position of the vector on the horizontal scanning line being scanned thereby to obtain the new position coordinates.

During the time periods other than the arithmetic operation periods FP and GP, incidentally, the outputs DY0 to DY17 all having the level "1" are generated from the scaler 520 in response to the signal $\overline{FG}$, as has been described before.

Thus, when the arithmetic operation of a certain block is ended, the next block is subjected to the arithmetic operation. As has been described before, the processing operations during the arithmetic operation periods are accomplished for a number of the blocks corresponding to one group, e.g., 32 blocks. The arithmetic processing operations of the one group are all ended during one horizontal scanning period. Moreover, the processing operations of the four groups are accomplished in parallel, as has been described before.

In the embodiment of the present invention, the display is effected with the use of the color monitor of the raster scanning type for the interlaced scanning. The displaying method in this instance will be described in detail in the following.

In the interlaced scanning operation thus far described, one frame is composed of two fields, and the scanning line of the second field is interposed between the scanning lines of the first field, thus constituting one picture frame.

FIG. 13 is a view for showing these interlaced scanning operations. In this instance, beginning at the bottom of the field, it is assumed that the horizontal scanning line 2FD of the second field is located between the horizontal scanning line 1FD and the next scanning line of the first numeral of the first field.

The vector position of the start point of the first field on the horizontal line, i.e., the initial value $Y_o$ is varied by the gradient $\Delta Y$ after one arithmetic operation, i.e., after one horizontal scanning operation. The position of the vector on the first horizontal operation. The position of the vector on the first horizontal scanning line is located at a. The position of the vector on the next scanning line is located at b. On the other hand, since the initial value of the vector of the second field on the start point scanning line takes the same value as that of the first field, the positions of the vector after the one and two horizontal scanning lines are located at a" and b" if the same arithmetic operations as the above are accomplished. In this instance, the interlaced scanning operation becomes nonsense. Therefore, only the vector of the second field is displayed at the points a' and b', where the half of the difference in the vector position between that field and the previous field is added to the position of the vector of the previous field.

However, there arises a disadvantage shown in FIG. 14 if the vector of the second field on the scanning line is displayed at a middle point of the vector position of the first field on the scanning line.

FIG. 14 shows the vector varying point. If the end point of the first vector at the first field is denoted at A and if the end point at the second field is denoted at B, the subsequent vector is varied while using those points A and B as start points. As a result, the first field of the next vector is denoted at A', and the second field is denoted at B' where the one half of the variation from the point A to the point A' of the first field is added to the point B so that the figure actually displayed is formed with such irregularities as are illustrated by ratching.

Therefore, the embodiment of the present invention is characterized by eliminating the aforementioned problems by separately handling the display of the vector and the arithmetic operation for determining the position of the vector on the scanning line. Specifically, if the aforementioned arithmetic operations for locating the vector on the scanning line are performed at the first and second fields, the arithmetic operation results are located at the same position (which is denoted at $Y_i$), as shown at circles of broken lines. On the other hand, the position of the vector on the scanning line before the arithmetic operation is located at the position (which is denoted at $Y_{i-1}$) which is smaller by $\Delta Y$ than $Y_i$, as shown at circles of solid lines. Upon the display, therefore, the arithmetic operation results at present are stored as they are so that the previous arithmetic result $Y_{i-1}$ is used as it is for the vector display of the first field whereas the result which is prepared by adding one half of $\Delta Y$ to the value $Y_{i-1}$ is used for the vector display of the second field. Thus, the display of the first field is effected as shown at circles of solid lines, whereas the display of the second field is effected as shown at solid marks x, thus eliminating the problem shown in FIG. 14.

These operations will be explained with reference to FIG. 9.

In FIG. 9, in response to the field signal 2F (which is shown in FIG. 4), the selector 514 selects the A side input, during the one field, so that its output is at "0". When the second field is reached, the selector 514 generates one half (which is prepared by shifting only one bit and by feeding the same to the selector 514) of the signal DY (i.e., the output of the shift portion 520) from the shifter 513. The resultant signal is fed to the adder 515 so that the arithmetic operations of $Y_{i-1}+\frac{1}{2}\Delta Y$ are accomplished.

On the other hand, since the data indicating the final point A of the first vector is stored separately in the memories 501 and 503, the timings, at which the carry output of the memory 503 is generated, become different for the first and second fields, if the contents of the memories 501 and 503 are left as they are, so that the figure to be displayed becomes unnatural. Therefore, the content of the memory 503 is kept at zero by the signal RCL indicating the end point of the vector.

From the adder 515, there is generated the signal $Y_{i-1}$ or $Y_{i-1}+\frac{1}{2}\Delta Y$, as has been described before. This output and the signal ADZ are stored in the output register 516 at the timing T3 when the signals FN and GN are at "0". In response to the signals RF and RG for each group, the content of the output register 516 is read out and fed for each group to the line memory 7 through the interface 6 of FIG. 1.

FIG. 16 shows the contents of the output control data which is stored in the buffer memory 27 or 37 of FIG. 3 and which is composed of the data G, L and P of the blocks of the respective groups. Among this data, the data G is used to indicate the monitor and to select one of the multiple monitors. The data L is used to indicate the color and to select the color to be displayed in each monitor. On the other hand, the data P is used to indicate the priority and to display only the figure having a high priority in case figures having different priorities are overlapped. This priority data P becomes the transmission ending signal TA indicating the end of the transmission of the figure, when all are at "0", and the transmission ending signals TB indicating shortage of the the capacity of the memory to be stored when all are at "1".

FIG. 17 shows an example of the concrete construction of the portion of the interface 6 of FIG. 1. Numeral 600 indicates a counter for counting clock signals CP. Numeral 601 indicates a decoder for decoding output control data PGL. Numerals 602 to 605 indicate selectors.

With the construction thus described, in order to partly use the output OY of the vector generator 5 as the write address of the line memory 7, as will be described later, and partly use the output of the counter 600 for counting the clock signals CP as the read address of the line memory, those outputs are impressed upon the selectors 602 and 603 and are interchangeably generated in response to the select signals SELLIN, which are repeatedly switched between the values "0" and "1" for each horizontal scanning line so that the address signals 1ADR and 2ADR are generated.

On the other hand, the results, which are obtained by decoding the output control data PGL from the buffer memory with the use of the decoder 601, are impressed upon the selectors 604 and 605 and are interchangeably generated in response to the select signals SELLIN so that the line memories are selected in accordance with the output signals 1CS and 2CS of the selectors 604 and 605. In order to select the arithmetic operation results OY as the address output 1ADR, when the select signal SELLIN at "1", thereby to write the arithmetic operation results OY at the side of the preset line memory corresponding to the address output 1ADR, the signal, which is prepared by decoding the output control data PGL, is selected as the signal 1CS which is fed to the line memory supplied with the address output 1ADR. On the other hand, in order to select the output of the counter 600 as the address output 2ADR thereby to read the data out of the terminals of all the line memories, which are supplied with the address output 2ADR, the signals all having "1" are selected as the signals 2CS which are to be fed to the line memory terminal supplied with the address output 2ADR.

FIG. 18 shows one example of the concrete construction of the portion of the line memory 7 of FIG. 1. The line memory shown is provided for each color of each priority of one monitor.

Each line memory is equipped with two-sided line memory portions, each of which has a bit capacity corresponding to the number of the picture elements of one horizontal scanning line such that the positions of the picture elements of the horizontal scanning line are made to correspond to the addresses of the memory. During one horizontal scanning period, there is recorded the address data, which correspond to the beam position on the horizontal scanning line generated as the result of the arithmetic operations of the vector generated, i.e., the signals "1". These signals are consecutively read out during the subsequent horizontal scanning period. In short, during a certain horizontal scanning period while one of the line memory portions is reading out the vector position on the horizontal scanning line under its scanning condition, the other line memory portion is written with the vector position of the horizontal scanning line to be subsequently scanned. These operations are switched for each horizontal scanning period. For example, if the number of the picture elements of the horizontal scanning line, i.e., the resolution in the horizontal direction is 1000, two sets of the line memory portions of 1000 words are required.

As shown, numerals 700 and 701 indicate flip-flops. Numerals 702 to 705 and 706 to 709 indicate random access memories (which will be referred to by RAM) having a capacity of 256 bits. Numerals 710 to 713 and 714 to 717 indicate tri-state gates. Numerals 718 and 719 indicate selectors. Numerals 720 and 721 indicate shift registers for serial conversion. Numeral 722 indicates a T flip-flop. Here, the RAMs 702 to 705 and 706 to 709 constitute the line memory portions, respectively. Moreover, each RAM is usually held under a read condition and is so constructed that it can be brought into its write condition by write signals 1LINCP and 2LINCP.

First of all, the writing operation of one of the line memory portions, e.g., the RAMs 702 to 705 will now be described with reference to the timings of FIG. 10.

As shown in FIG. 17, when a certain horizontal scanning period is reached, the results which are obtained by decoding the output control signal PGL are selected by the selector 604 in accordance with the select signal SELLIN and are used as the line memory selecting signal LCS. As a result, the line memory which is indicated by the output control signal PGL is selected, and the arithmetic operation result OY is selected by the selector 602 in accordance with the select signal SELLIN and is fed out as the address signal 1ADR. On the other hand, the flip-flop 700 is cleared in response to the signal 1CL, which is synchronized with the signal CL of FIG. 10, and the data at the D terminal of the flip-flop 700 is taken thereinto in response to the subsequent timing signal CPLINDO (as shown in FIG. 10). At this time, only one of the tristate gates 710 to 713 is selected in accordance with the address signal 1ADR so that the read output of the RAM selected is fed to the D terminal of the flip-flop 700. If, therefore, the addresses of the RAMs 702 to 705 indicated by the address signal 1ADR are written with "1", the D terminal is supplied with "0" so that the output of the flip-flop 700 is at "0". On the other hand, if the contents of the addresses of the indicated RAMs 702 to 705 are at "0", the output of the flip-flop 700 is at "1". At the next step, if the RAMs 702 to 705 are supplied with the signal 1LINCP which is synchronized with the write signal SLINCP shown in FIG. 10, the address of the specified RAM which is indicated by the address signal 1ADR is written with the output data of the flip-flop 700. In other words, if the address of the RAM indicated by the address signal 1ADR is written in advance with "1", this value is rewritten to "0". The value "0", if written, is changed to "1".

These operations are accomplished for the following reasons.

Specifically, as will be described later, the data which is read out of the line memory portions are fed to T flip-flop 722 to form such a plain figure as is filled in between the two vectors. For example, in case the two vectors are aligned as at the point P or Q of FIG. 2(*b*), or in case the figures of the same color are overlapped while having the same priority, the flip-flop 722 continues its set condition with the result that one line appears in the figure displayed. In the aforementioned example, therefore, in case there is only one vector position on one horizontal scanning line, the value "1" written is changed to "0" so that it may be eliminated.

Now, the reading operations of the data, which are written in the other line memory, e.g., the RAMs 706 to 709, will be described in detail with reference to the timing chart of FIG. 19.

In FIG. 19: letters HSYNC indicate the horizontal synchronizing signal; letters SELLIN indicate the select signals which are alternately generated for the respective horizontal periods; letters LBHSYN indicate the signal which is generated at the trailing end of the horizontal synchronous signal; letters SELSR indicate the select signals which are alternately generated for preset periods; letters SR1CP and SR2CP indicate the shift signals for shifting the contents of the shift registers 720 and 721, respectively; letters SR1Ld and SR2LD indicate the load signals for introducing the data into the shift registers 720 and 721, respectively; and letters ELINCP indicate erasing signals.

During a certain horizontal scanning period, in case the RAMs 702 to 705 are under their write condition whereas the RAMs 706 to 709 are under their read condition, the results, which are obtained by counting the clock signal CP by means of the counter 600, are selected in accordance with the select signal SELLIN, as shown in FIG. 17, are selected by the selector 603 so that they are fed out as the address signals 2ADR, whereas the signals all having "1" are selected by the selector 605 so that they are fed out as the signals 2CS. Thus, all the line memories are selected and are supplied with the address signals −512 to +512 which are consecutively indicated by the counter 600 so that the contents of the addresses corresponding to the RAMs 706 to 709, respectively, are simultaneously read out and fed to the selector 718. Since, at this time, the selector 718 is made to select the outputs of the RAMs 706 to 709 in accordance with the select signals SELLIN, the signals selected are alternately stored in the shift registers 720 and 721 in response to the load signals SR1LD and SR2LD, and their contents are shifted by the shift signals SR1CP and SR2CP and fed as the series signals to the selector 719 so that they are alternately selected by the select signals SELSR and fed to the flip-flop 722. In this flip-flop, the conditions are reversed for each output of the selector 719 thereby to generate the plain figure as its output OUT. More specifically, the output of the selector 719 indicates the contour figure so that a plain figure can be formed by impressing the output upon the T flip-flop. Incidentally, the flip-flop 722 is cleared in response to the signals LBHSYNC which are generated at the trailing end of the horizontal synchronizing signals.

On the other hand, since the line memory portion which has been subjected to the reading operation has to be cleared for the subsequent writing operation, the memory is written with "0" before the counter 600 of FIG. 17 is renewed.

Specifically, upon the reading of the contents of the RAMs 706 to 709, the tri-state gates 714 to 717 are not opened so that the flip-flop 701 continues its reset condition to have its output at "0". As a result, the address which has been subjected to the reading operation is written with "0" in response to the signals 2LINCP which are synchronized with the erasing signals ELINCP.

During the subsequent scanning period, the select signals SELLIN are reversed so that the reading operations are effected at the RAMS 702 to 705 whereas the writing operations are effected at the RAMs 706 to 709.

The output OUT thus obtained is fed to the coloring circuit 8 of FIG. 1, where the coloring treatment is accomplished.

In FIG. 20 showing one example of the diagrammatical construction of the coloring circuit portion: numerals 800, 801 and 802 to 804 indicate a priority encoder, a memory and D/A converters, respectively.

The coloring circuit 8 is supplied with the signals OUT1 to OUTn which come from the line memories provided for the respective colors of the respective priorities. Those signals are fed to the priority encoder 800 so that the output of the line memory having a high priority is selected and fed as the address to the memory 801. This memory 801 is stored with the color signals R, G and B to be displayed. If the output of the priority encoder 800 is received as the address, the corresponding color signal is generated and fed to the monitor 9 through the D/A converters 802 to 804.

As a result, the monitor 9 can display the figure of the overlapped portion, which has the higher priority, while preventing the same from being displayed in mixed colors.

FIG. 21 shows one example of the concrete construction of the timing control circuit of FIG. 1.

In this Figure: numeral 1000 indicates a clock generator; numeral 1001 indicates a synchronizing signal generator; numerals 1002 and 1003 indicate flip-flops; numerals 1004 to 1007 indicate counters; numeral 1008 indicates a read-on memory (ROM); numerals 1009 to 1011 indicate selectors; numeral 1012 indicates a one-shot multivibrator; numeral 1013 indicates a T flip-flop; numeral 1014 indicates an inverter; numerals 1015 to 1018 indicate AND gates; numeral 1019 indicates a NOR gate; and numeral 1020 indicates an OR gate.

With these construction arrangements, the clock generator 1000 generates the clock signals CP to be fed to the counter 600 of FIG. 17 and the clock signals to be fed to the synchronizing signal generator 1001 and the counters 1004 and 1007. The synchronizing signal generator 1001 generates the clearing signals CL, which are fed out as the clearing signals 1CL and which are inverted into the clearing signals 2CL by the inverter 1014. On the other hand, the generator 1001 generates both the vertical driving signals VD, which are inverted from the vertical synchronizing signals, and the signals 2F which indicate the scanning operation of the second field, and the AND operation is taken between those two signals by the AND gate 1015. As a result, the signals at "1" are generated during the scanning period of the second field by the AND gate 1015. In addition, the generator 1001 generates the signals LBHSYNC which rise at the trailing end of each horizontal synchronizing signal.

The flip-flop 1002 is set in response to the signals VD thereby to generate the signals TR shown in FIG. 4.

The counter 1004 counts the clocks from the clock generator 1000 and feeds the results as the address signals of the ROM 1008 so that the corresponding various timing signals are read out of the ROM.

On the other hand, data signals D1 to D3, writing clock signals WRCP and clearing signals DCL are fed from the processing device of FIG. 1 such that they correspond to the aforementioned transmission ending signals TA and TB when the data signals D1 to D3 are all at "0" and "1". Moreover, the signals WRCP are the clock signals for storing the data of the processing device 1 in the buffer memory 2 or 3.

Now, if the transmission ending signal TA or TB is fed out of the processing device 1 and if the writing clock signals WRCP are simultaneously fed out, the flip-flop 1003 is set. In response to the signal TB, moreover, buffer memory write prohibiting signals POVR are generated. When the scanning period of the second field is reached after the flip-flop 1003 is set, the AND gate 1018 is opened so that the interrupt signals IP of a preset width are generated from the one-shot multivibrator 1012 and fed to the processing device 1. On the other hand, the T flip-flop 1013 is set or reset in response to the output of the AND gate 1018. The output of that flip-flop 1013 is used as the switching signals RDM for the buffer memories 2 and 3 of FIG. 1.

The counter 1005 counts the write clock signals WRCP so that the outputs are selected by the selectors 1010 and 1011 and fed as address signals 1MADR and 2MADR thereby to indicate the memory address for writing the data in the buffer memory 2 or 3. The address signal 1MADR indicates the address of one of the two-sided buffer memories 2 and 3 whereas the address signal 2MADR indicates the address of the other buffer memory 2 or 3. The counter 1007 counts the pulses from the clock generator 1000 whereas the counter 1006 counts the timing signals which are read out of the ROM. The counted results of those counters are fed out as the address signals ADR to effect the selections at the selector 1009, which is made responsive to the signals TR, such that the B input is selected for TR=1 whereas the A input is selected for TR=0. As a result, the address for effecting the transfer from the buffer memories 2 and 3 to the working memory in the vector generator is indicated in accordance with the output of the counter 1007, whereas the address for the arithmetic operation period in the vector generator is indicated in accordance with the output of the counter 1006. On the other hand, the selectors 1010 and 1011 select the A input, when the output Q of the T flip-flop 1013 is at "0", and the B input when the output Q is at "1". As a result, when the output Q of the flip-flop 1002 is at "0", for example, the buffer memory supplied with the address signals 1MADR is written with the data from the processing device 1 by the counter 1005, whereas the buffer memory supplied with the address signals 2MADR transfers the data from the buffer memory to the working memory by the action of the counter 1007 during the vertical blanking period (for TR=1). After the vertical blanking period, the address of the working memory upon the arithmetic operation is indicated by the counter 1006. On the contrary, when the output Q of the flip-flop 1002 takes the value "1", the data writing operations are performed in the buffer memory which is supplied with the address signals 2MADR in the opposite manner to the above.

It is to be noted that the flip-flop 1002 is set by the carry output CR of the counter 1007.

As is now apparent from the embodiment thus far described, according to the present invention, since the arithmetic operations are repeated with the use of the common circuit while using as a unit fundamental figure which is defined by a preset number of, e.g., four vectors and since the display data is stored for each horizontal scanning line, a number of figures can be displayed with the use of a remarkably simple circuit construction.

Incidentally, it goes without saying that the foregoing embodiment is nothing but an example and can be modified in various ways according to the gist of the present invention.

We claim:

1. A device for displaying plural fundamental figures comprising: first means for generating the start and end point coordinate data and the gradient data of the respective vectors of fundamental figures which are formed by a preset number of vectors; first memory means for storing the start and end point coordinate data; second memory means for storing the gradient data; display means for displaying the fundamental figures in a raster scan of horizontal lines; arithmetic operation means, operative during the scanning operation of a first horizontal scanning line on said display means prior to the scanning operation of a second horizontal scanning line thereon, for examining whether or not the vectors forming each fundamental figure are located on said second scanning line on the bases of the data from said first memory means and for feeding out the start point coordinate data and adding the gradient data from said second memory means to the start point coordinate data from said first memory means, when the vector is located on said second scanning line, thereby to renew the start point coordinate data of said first memory means in accordance with the sum of the gradient data and the start point coordinate data; third memory means having the capacity corresponding to the number of picture elements in said second horizontal scanning line and being operative to store preset data in an address corresponding to the start point coordinate data provided by said arithmetic operation means; and control means for displaying, during the scanning operation of the second horizontal scanning line, the data from said third memory means on said display means.

2. The displaying device according to claim 1, wherein said arithmetic operation means comprises means for performing the arithmetic operation for the respective fundamental figures at respective time periods provided for the respective fundamental figures during the scanning operation of the first horizontal scanning line.

3. A figure displaying device as set forth in claim 1, wherein said arithmetic operation means includes means for reading the horizontal scanning line number of the start and end points of the respective vectors of the respective fundamental figures out of the first-named memory, for subtracting only one from the read value and for examining whether the result assumes a preset value or not thereby to detect whether the respective vectors are located on said horizontal scanning line or not, means for reading the position of the start point of the vector on said horizontal scanning line and the gradient of the vector out of the first- and second-named memories and for adding the added results, and means for renewing the position of the vector on the horizontal scanning line, which corresponds to the first-named memory, in accordance with the results obtained by said means.

4. A figure displaying device as set forth in claim 3, wherein said arithmetic operation means further includes means for adding one half of the gradient data, which are read out of the second-named memory, to the position of the vector, which is read out of the first-named memory, during the scanning operation of the horizontal scanning line of the second field thereby to feed the result to the third-named memory.

* * * * *